UNITED STATES PATENT OFFICE.

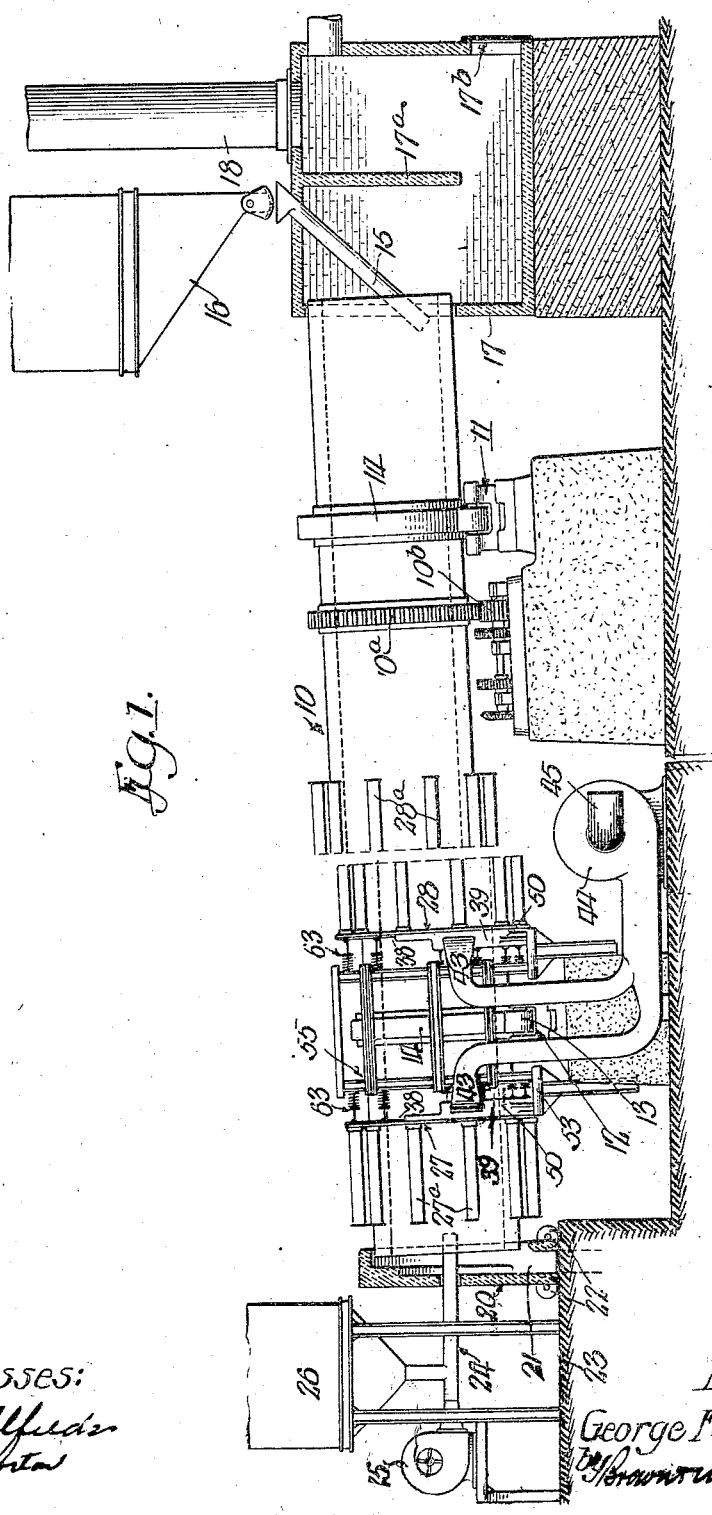

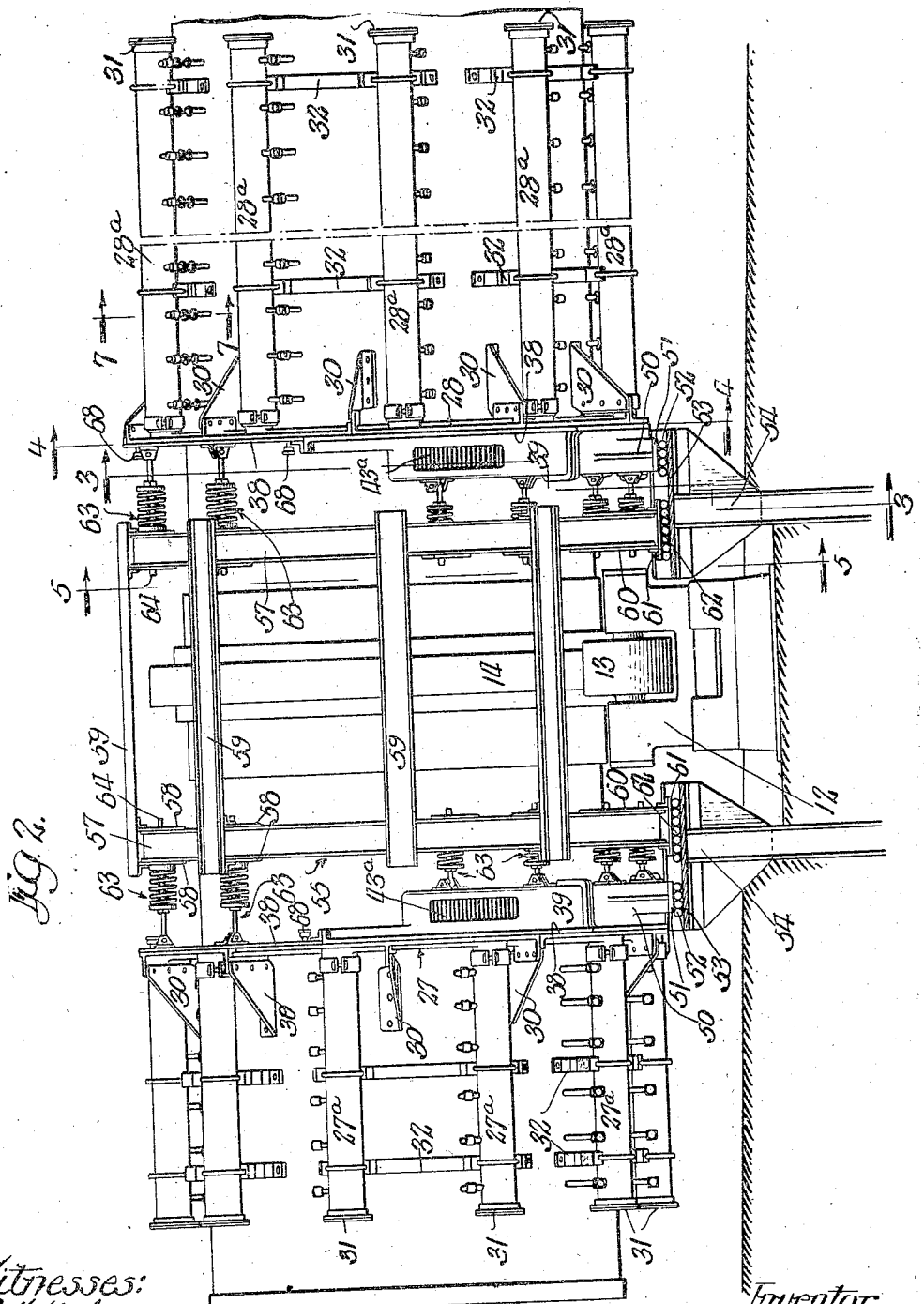

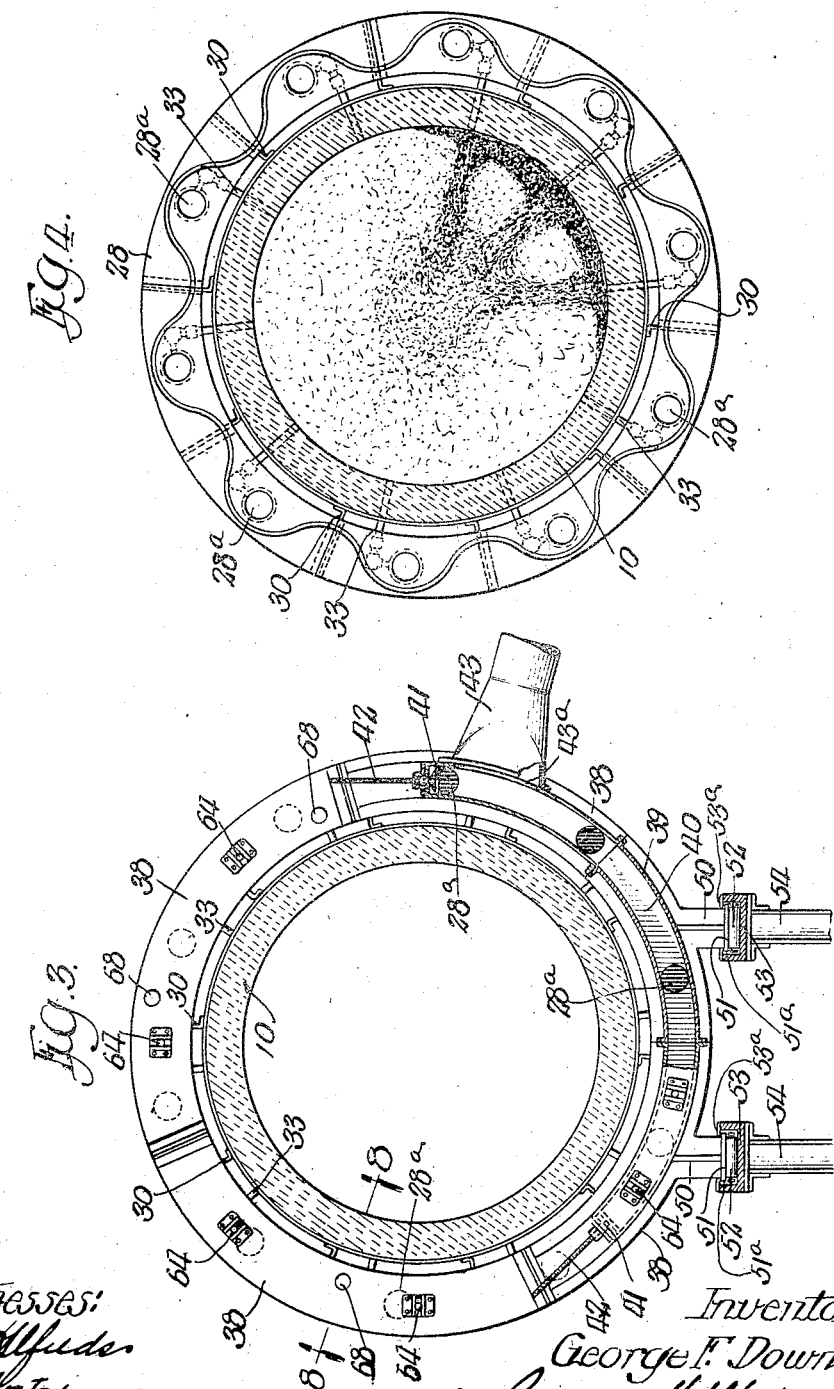

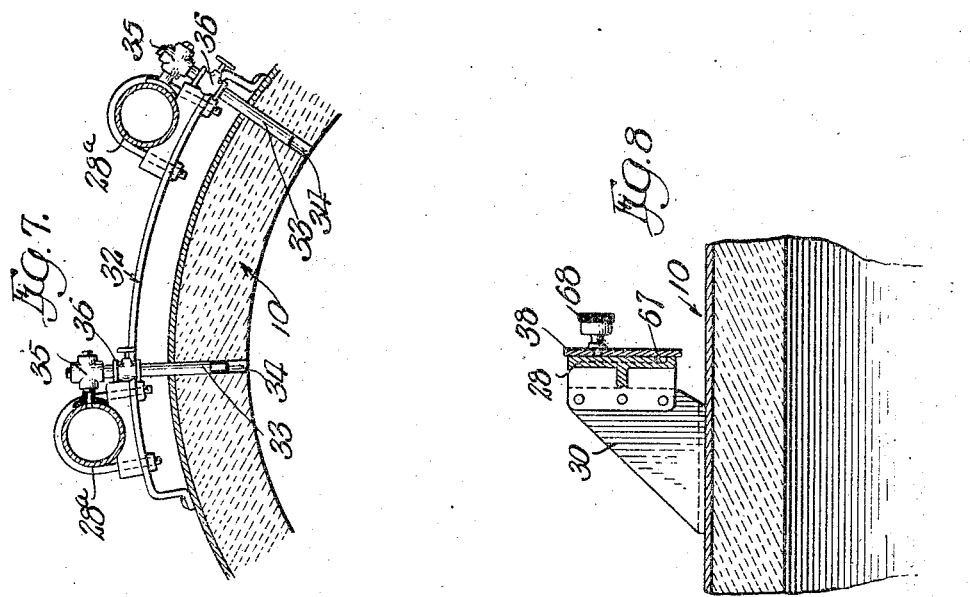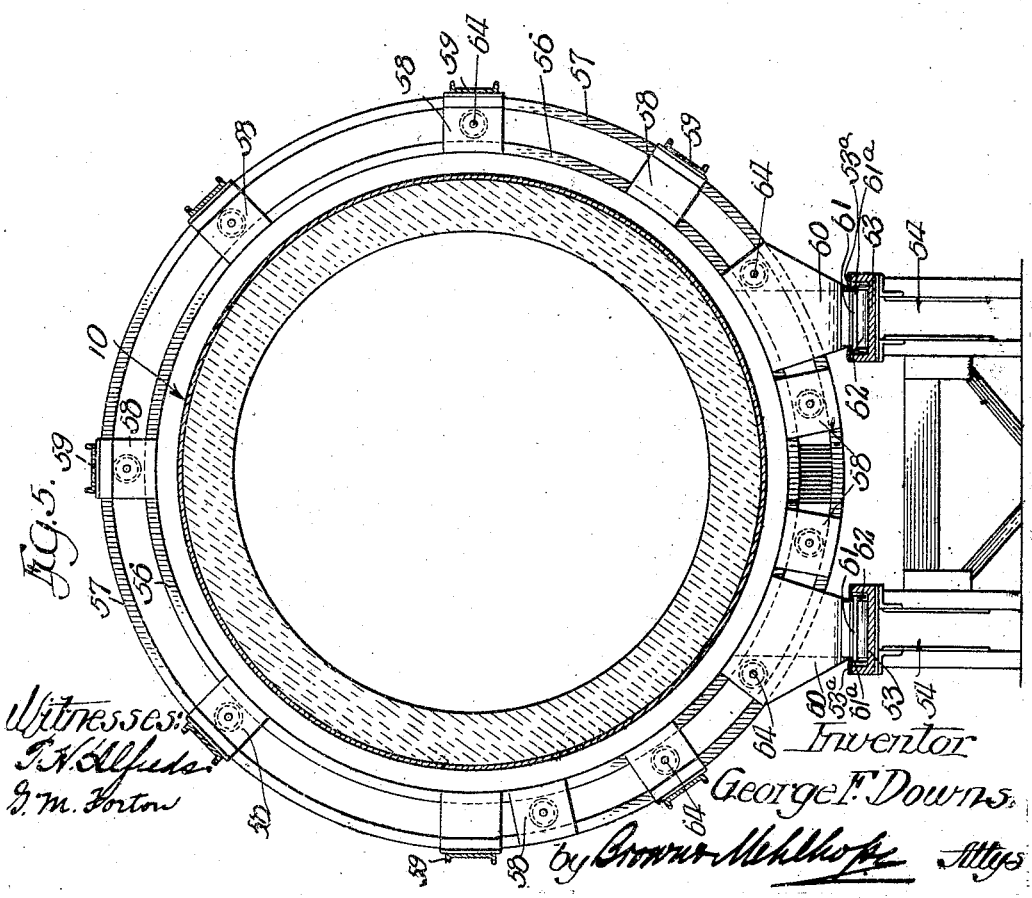

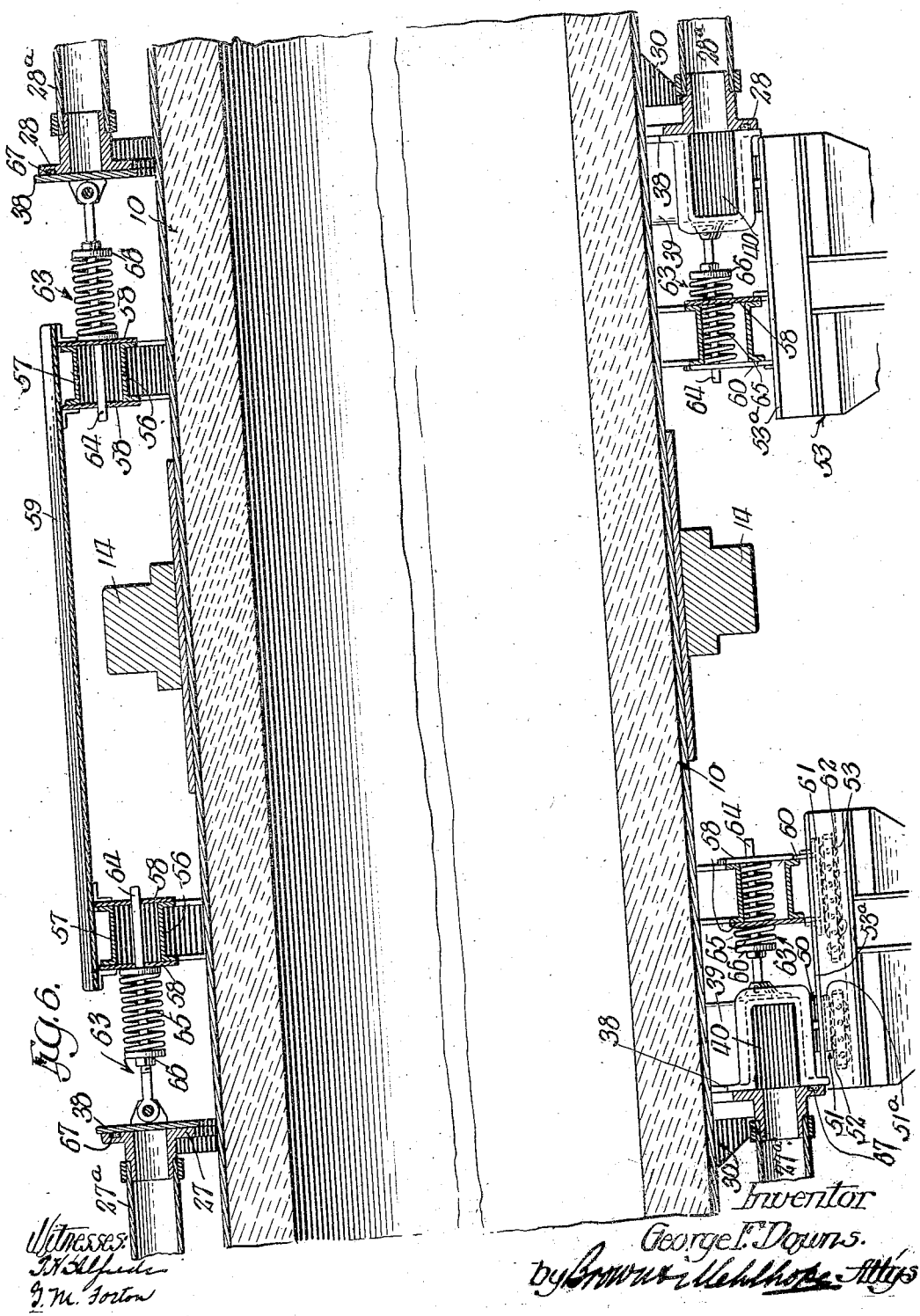

GEORGE F. DOWNS, OF BUFFALO, NEW YORK.

ROTARY FURNACE OR KILN.

1,151,574.  Specification of Letters Patent.  Patented Aug. 31, 1915.

Application filed March 19, 1915. Serial No. 15,408.

*To all whom it may concern:*

Be it known that I, GEORGE F. DOWNS, a citizen of the United States, and a resident of Buffalo, in the county of Erie and State of New York, have invented certain new and useful Improvements in Rotary Furnaces or Kilns; and I do hereby declare that the following is a full, clear, and exact description thereof, reference being had to the accompanying drawings, and to the letters of reference marked thereon, which form a part of this specification.

This invention relates to improvements in rotary furnaces or kilns adapted for roasting, sintering or like treatment of ores and consists of the matters hereinafter described and more particularly pointed out in the appended claims.

The improved furnace is of especial advantage for use in treating comminuted material which has a fuel content, such for example, as flue dust, which consists largely of finely divided iron ore, coke and limestone. Such flue dust is produced in the manufacture of pig iron in a blast furnace and is carried out of the furnace by the waste gases and is collected in a familiar manner.

My furnace is slightly inclined downwardly from the free end toward the discharge end and the flue dust or other material to be treated is subjected, in its passage through the rotating furnace, to heat which is produced in the beginning by means of fuel, either finely divided carbon or gas, blown in at the discharge end of the furnace. In addition the material is subjected to heat produced by the combustion of the finely divided carbon contained in the flue dust so that the iron ore is thoroughly heated and, together with the limestone or other like material, is caused to agglomerate into a sinter, in which form it is delivered from the discharge end of the furnace. From this sinter the metal is finally recovered in another apparatus in a familiar manner.

In the course of the passage of the flue dust through the furnace, it is subjected to the action of radial blasts of air directed through twyers that penetrate the furnace wall, which blasts not only provide the air necessary for burning the carbon content of the flue dust, but in addition act to scatter and violently agitate the material being treated, thus producing a continuous bombardment of the material in its passage through the twyer area. This facilitates the mechanical union of the metallic and binder content of the material while the chemical process of combustion provides the necessary heat to permit such mechanical action.

My improved rotary furnace in its preferred form comprises in general a rotating cylinder inclined downwardly from the feed end thereof, together with anti-friction bearings for rotatively supporting said cylinder, and means for imparting to it the desired rotative movement; a chute at the feed end of the cylinder for supplying the material, for example, flue dust, to be treated, together with a chamber closing the feed end of the furnace and a stack rising from said chamber; a hood to close the discharge end of the furnace having a pocket to receive the sintered material as it is discharged from the furnace; means for introducing fuel into the discharge end of the furnace; one or more manifold heads, rotating with the furnace, together with the associated manifold pipes and twyers; one or more non-rotative blast heads, there being a blast head associated with each manifold head; a non-rotative abutment member provided with elastic flexible cushions by means of which each blast head is held closed against its associated manifold head while at the same time permitting movement or slip between the same in a direction radial to the furnace required by any circumferential distortion of the furnace or heads; and means providing supports for the blast heads and for the abutment including anti-friction devices whereby the blast head or heads and the abutment are made free to move in a direction longitudinal of the furnace as said furnace expands or contracts in the direction of its length.

The various advantages of my improved rotary furnace and of the novel features embodied therein, will appear clearly and will be more definitely pointed out as I proceed with my specification.

In the drawings: Figure 1 is a view representing a side elevation of my improved rotary furnace, the chamber at the feed end of the furnace and the hood at the discharge end of the same being shown in vertical section. Fig. 2 is a view representing on an enlarged scale a side elevation of the twyer area of the furnace, with several parts shown in vertical section. Figs. 3 and 4 are views representing transverse sections through the furnace in planes indicated respectively by the lines 3—3 and 4—4 of Fig. 2. Fig. 5 is a view on a slightly enlarged scale showing a transverse section through the furnace in a plane indicated by the line 5—5 of Fig. 2. Fig. 6 is a view representing on a still further enlarged scale a partial longitudinal vertical section through the furnace in the twyer area thereof. Fig. 7 is a view representing a partial transverse section through Fig. 2 in a plane indicated by the line 7—7 of Fig. 2. Fig. 8 is a view representing on an enlarged scale a partial radial section through Fig. 3 in a plane indicated by the line 8—8 thereof.

Referring now to that embodiment of my invention illustrated in the drawings:—10 indicates the furnace proper, which consists of a rotating cylinder lined on the interior with refractory material in a familiar manner and mounted to rotate on supports 11, 12, which are provided with anti-friction rollers 13. The cylinder has annular bands or rails 14 fixed to its outer surface and bearing upon the said anti-friction rollers 13. A spur gear $10^a$ fixed to the cylinder 10, and a driving pinion $10^b$ mounted on a suitable foundation below the furnace, together with the necessary power connections (not shown), provide for the rotative drive of the furnace.

The furnace 10 is inclined downwardly (from right to left as shown in Fig. 1), the higher end (at the right) being the feed end and the other end being the discharge end. An inclined chute 15 is located at the higher end of the cylinder to receive and deliver the flue dust, or other material that is to be treated, into the furnace. Said material is supplied from a hopper 16 placed above the mouth of the chute.

17 indicates a stack chamber which closes the feed end of the furnace and 18 indicates a stack connected with said chamber. A baffle wall $17^a$ in the chamber 17 interrupts the flow of the heavier constituents of the products of combustion passing from the furnace to the stack and causes them to collect in the bottom of the chamber 17, from which they may be removed through a door $17^b$.

The discharge end of the furnace is closed by a hood 20 of familiar construction. Said hood is provided with a pocket 21 to receive the sintered or roasted material as it is delivered from the furnace, suitable provision, (not shown) being made for removing the sintered material from the pocket. The hood is mounted upon rollers 22 that roll on a platform support 23, the construction being such that the hood may be withdrawn from the discharge end of the furnace, in order to get at the same for cleaning it, or for any other purpose.

24 indicates a pipe extending through the hood and into the discharge end of the furnace for introducing fuel, (gas, powdered coke or other carbonaceous material) to preliminarily heat the furnace. It may also be used for adding to the heat of the furnace in case the heat produced by the combustion of the carbon content of the material under treatment is not sufficient to carry on the roasting or sintering process in the furnace.

25 indicates a fan connected with the pipe 24 and adapted for driving the fuel into the furnace.

26 indicates a hopper containing powdered coke, where such fuel is to be used, which is likewise connected with the pipe 24.

27, 28 indicate flat annular plates surrounding the furnace, and located near the discharge end thereof. Said plates are spaced radially from, and fixed concentrically with reference to the outer surface of the furnace. Each annular plate, as shown, is made up of a plurality of parts provided at their adjacent ends with flanges, by means of which they are secured together and to radially extending brackets 30 fixed to the outer surface of the furnace. Each of said plates constitutes a manifold head.

$27^a$, $28^a$ indicate a plurality of manifold pipes extending parallel to the longitudinal central axis of the furnace and arranged symmetrically about its periphery. The said manifold pipes $27^a$, $28^a$ are provided with removable closures 31 at one end, that is to say, the end remote from their respective heads 27, 28, and their other ends are secured respectively to the manifold heads 27, 28, which are provided with holes or openings in line with the bores of the said manifold pipes. The said pipes $27^a$, $28^a$ are supported by suitable yokes 32 placed intermediate their ends and fixed to the outer surface of the cylinder 10. (See Fig. 7.)

Each manifold pipe has connected to it a plurality of short pipes 33 of comparatively small diameter, which penetrate or extend through radial openings 34 in the metallic shell and lining of the furnace cylinder so as to communicate with the interior of the furnace. Said pipes 33 constitute twyers by means of which air or gas is delivered in the form of radially directed blasts from the manifold pipes $27^a$, $28^a$ into the interior of the furnace. The twyers 33 are arranged at one side of and at right angles to their respective manifold pipes, suitable connections between the manifolds and the twyers being made by means of cross fittings 35. A valve 36 is interposed in each twyer pipe 33 to control the rate of flow of air or gas through the same. By means of the valves 36 the blasts through the twyers from the manifolds may be varied in any desired manner, as, for example, to increase the blasts from the twyers in graduated relation from one end of the twyer area of the furnace to the other.

With each manifold head 27, 28, is associated a non-rotative blast head 38 which engages against the said manifold head and closes the openings therein, and in addition supports a wind box by means of which a blast of air or gas is supplied simultaneously to one or more of the associated manifold pipes. Said blast head is annular and of substantially the diameter of its associated manifold head. It consists throughout part of its circumference of a flat ring which provides the engaging face of the blast head and throughout the balance of its circumferential length it is made in the form of a wind box 39 with a flat base which provides the engaging face and which contains in its side next to the manifold head an annular slot 40 adapted to register with the openings in the associated manifold head. The part of the blast head containing the wind box is long enough to cover a plurality of the said openings in the associated manifold head at the same time and as shown in the drawings, is long enough to cover four of said openings. Dampers 41 are provided in the blast head at each end of the wind box to partially close the slot in the side of said box next to the manifold head. Said dampers are controlled by means of screws 42 in a familiar manner and are adapted, within the range of their travel, to determine the number of manifolds simultaneously exposed to the entrance of air, or gas, from the wind box.

Air is admitted to the wind boxes in the blast heads through openings 43ª by ducts or pipes 43 which lead from a fan or blower 44. The fan is provided with an inlet pipe 45 which may open into the air, where air alone is to be supplied to the furnace through the twyers or may be connected to some source of gas supply where the material in the furnace is to be treated with a gas other than air.

The blast heads 38 have horizontally spaced legs 50 on their bottom sides. Said legs are provided with flat bearing plates 51 which rest upon anti-friction rolls 52 with their axes transversely of the longitudinal axis of the furnace and adapted to ride on a horizontal bearing plate 53 fixed to the top of a suitable support 54. The legs 50 and the supports 54 are provided with suitable inter-engaging horizontal flanges 51ª, 53ª adapted to securely anchor the blast heads against an overturning movement.

A non-rotative abutment member provided with elastic flexible cushions is associated with each manifold head and blast head in such manner as to yieldingly hold the blast head in closed relation against its associated manifold head, while at the same time permitting a free, sliding relation between the two heads, not only in a rotative direction to allow the rotation of the manifold heads with respect to the fixed blast head, but also to permit sliding movement between said heads in a radial direction which may occur on account of the distortion of the one head in a circumferential direction with reference to the other.

In the embodiment of the invention illustrated in the drawings, there are provided two sets of manifold heads with their associated manifold pipes and twyers and blast heads, and in such case the abutment member is placed as shown, intermediate the two blast heads, so that but one abutment member is required and each manifold head and blast head thus acts as a backing or stop for the abutment member with reference to the other manifold head and blast head. 55 indicates the said abutment member, which is in the form of an annular frame surrounding the furnace and consisting of two pairs of radially spaced rings 56, 57 connected by radially disposed plates 58 with the rings of the two pairs connected by longitudinally extending bars 59. Said buffer frame has on its bottom side upright legs 60, 60, there being a pair of such legs at each end of said frame. Said legs have flat bearing plates 61 which ride on rollers 62 placed with their axes transverse of the longitudinal axis of the furnace and carried on the bearing plates 53 at the tops of the supports 54. Said legs and supports are provided with horizontal inter-engaging flanges 61ª, 53ª, adapted to anchor the abutment frame and hold it against rotative movement, while at the same time permitting its free riding movement on the anti-friction rollers in the direction of the length of the furnace.

Between each end of the abutment frame 55 and the proximate blast head is interposed a plurality of flexible annularly arranged elastic cushions 63 (see Figs. 2 and 6) which act to hold the respective blast heads in elastic yielding engagement with the associated manifold heads. Each of the elastic cushions consists of a rod 64 pivotally connected at one end to suitable lugs on the outer face of the blast head 38 and extending at its other end through openings in the plates 58 of the buffer frame 55, and of a coiled spring 65 mounted on said rod and interposed between a collar 66 fixed on the said rod and the proximate end of the buffer frame. Manifestly the said springs act to hold the blast head with a yielding pressure against the manifold heads.

With a construction such as described, yielding engagement between each blast head and its associated manifold head will always be maintained, notwithstanding the fact that one is rotative while the other is fixed, and at the same time the flexible connection of the rods 64 with the blast head permits a relative wave-like motion of the one head in a radial direction with reference to the other head that may occur on account of the relative annular distortion of the two heads. In addition, since the abutment member and the blast head are capable of free movement in the direction of the length of the furnace, the blast heads will always be maintained in proper closed engagement against the manifold heads, no matter how much the furnace may lengthen or contract in length owing to variations in temperature or other conditions.

Since the manifold heads and the blast heads which close upon them are removed from the outer surface of the furnace, they may be freely lubricated by means of grease without danger of said grease drying out.

I provide in the engaging face of one or the other of the associated heads (as shown in the drawings, in each manifold head) a groove 67 which preferably follows a tortuous path in and about the manifold openings of the head. This groove is adapted to contain grease which both provides a seal and provides for lubrication between the two heads in the relative movement thereof. The grease may be supplied to this groove by means of suitable grease cups 68 fixed to the manifold head as shown in Fig. 8.

It will be manifest to those familiar with the art that on account of the construction and arrangement of the manifolds, manifold heads, blast heads and the abutment for yieldingly maintaining said heads in engaging relation, and on account of the fact that in my construction of furnace the fuel may be fed from the ends of the furnace, the novel features of my construction may be applied to any rotating furnace, kiln or the like without obstructing the feeding end or discharging end of the furnace and permitting a continuous feed into and discharge from the rotary cylinder of the furnace.

While in describing the preferred embodiment of my invention, I have referred to certain details of mechanical construction and arrangement, it is to be understood that the invention is to be in no way limited thereby except as may be pointed out in the appended claims.

I claim as my invention:

1. In combination with the rotating cylinder of a furnace of the type described, a manifold and a manifold head fixed on said cylinder and communicating with the interior thereof, a non-rotative blast head closed against said manifold head, and means for holding said blast head in closed engagement against said manifold head while at the same time permitting free, relative sliding movement between said heads in any direction in the plane of their contact.

2. In combination with the rotating cylinder of a furnace of the type described, a manifold and a manifold head fixed on said cylinder and communicating with the interior thereof, a non-rotative blast head closed against said manifold head, and yielding means adapted for retaining said blast head in closed engagement against said manifold head while at the same time permitting free, relative sliding movement between said heads in any direction in the plane of their contact.

3. In combination with the rotating cylinder of a furnace of the type described, a manifold and a manifold head fixed on said cylinder and communicating with the interior thereof, a non-rotative blast head closed against said manifold head, and elastically yielding means for retaining said blast head closed on said manifold head while at the same time permitting free, relative sliding movement between said heads in any direction in the plane of their contact.

4. In combination with the rotating cylinder of a furnace of the type described, a manifold and a manifold head fixed on said cylinder and communicating with the interior thereof, a non-rotative blast head closed against said manifold head, and means for supporting said blast head, said supporting means including anti-friction devices for permitting free movement of said blast head in the direction of the length of said cylinder.

5. In combination with the rotating cylinder of a furnace of the type described, a manifold and a manifold head fixed on said cylinder and communicating with the interior thereof, a non-rotative blast head closed against said manifold head, a non-rotative abutment member located adjacent to said blast head, and flexible yielding cushions interposed between said abutment member and said blast head to hold said blast head closed on said manifold head while at the same time permitting free, relative sliding movement between said heads in any direction in the contact plane of said heads.

6. In combination with the rotating cylinder of a furnace of the type described, a manifold and a manifold head fixed on said cylinder and communicating with the interior thereof, a non-rotative blast head closed on said manifold head, a non-rotative abutment member placed adjacent to said blast head, and flexible, elastically yielding cushions interposed between said abutment member and said blast head to hold said blast head closed on said manifold head while at the same time permitting free, relative sliding movement between said heads in any direction in the plane of their contact.

7. In combination with the rotating cylinder of a furnace of the type described, a manifold and a manifold head fixed on said cylinder and communicating with the interior thereof, a non-rotative blast head closed on said manifold head, means for supporting said blast head permitting movement thereof in a direction longitudinal of the furnace cylinder, a non-rotative abutment member placed adjacent to said blast head, a support for said abutment member, means resisting the movement of said abutment member away from said blast head, and a plurality of flexible yielding elastic cushions interposed between said abutment member and said blast head adapted for holding said blast head in closed relation against said manifold head and at the same time permitting free, relative sliding movement between said heads in any direction in the plane of their contact.

8. In combination with the rotating cylinder of a furnace of the type described, a manifold and a manifold head fixed on said cylinder and communicating with the interior thereof, a non-rotative blast head closed on said manifold head, means for supporting said blast head permitting movement thereof in a direction longitudinal of the furnace cylinder, a non-rotative abutment member placed adjacent to said blast head, a support for said abutment member permitting movement of the same in the direction of the length of said cylinder, means resisting the movement of said abutment member away from said blast head, and a plurality of flexible yielding cushions interposed between said abutment member and said blast head adapted to hold said blast head in closed relation on said manifold head while permitting free, relative sliding movement between said heads in any direction in the plane of their contact.

9. In combination with the rotating cylinder of a furnace of the type described, two sets of manifolds and manifold heads fixed on said cylinder with said heads facing each other and spaced longitudinally apart, said manifolds communicating with the interior of said cylinder, a non-rotative blast head for each manifold head, a non-rotative abutment member interposed between said blast heads, and flexible yielding cushions interposed between said abutment member and each blast head adapted for holding each blast head against its associated manifold head while at the same time permitting free, relative movement between the associated heads in any direction in the plane of their contact.

10. In combination with the rotating cylinder of a furnace of the type described, two sets of manifolds and manifold heads fixed on said cylinder and spaced longitudinally apart on said cylinder with the two heads facing each other, said manifolds communicating with the interior of said cylinder, a non-rotative blast head for each manifold head, a non-rotative abutment member interposed between said blast heads, flexible yielding cushions interposed between said abutment member and each blast head for holding the said blast head against its associated manifold head while permitting free, relative sliding movement between the associated heads in any direction in the plane of their contact, and supports for said blast heads and for said abutment member providing for sliding movement of the same in the direction of the length of said furnace cylinder.

11. In combination with the rotating cylinder of a furnace of the type described, two sets of manifolds and manifold heads fixed on said cylinder and spaced longitudinally apart on said cylinder with the two heads facing each other, said manifolds communicating with the interior of said cylinder, a non-rotative blast head for each manifold head, a non-rotative abutment member interposed between said blast heads, flexible yielding cushions interposed between said abutment member and each blast head for holding the said blast head against its associated manifold head while permitting free, relative sliding movement between the associated heads in any direction in the plane of their contact, and supports for said blast heads providing for sliding movement of the same in the direction of the length of said furnace cylinder.

12. In combination with the rotating cylinder of a furnace of the type described, two sets of manifolds and manifold heads fixed on said cylinder and spaced longitudinally apart on said cylinder with the two heads facing each other, said manifolds communicating with the interior of said cylinder, a non-rotative blast head for each manifold head, a non-rotative abutment member interposed between said blast heads, flexible yielding cushions interposed between said abutment member and each blast head for holding the said blast head against its associated manifold head while permitting free, relative sliding movement between the associated heads in any direction in the plane of their contact, and supports for said blast heads and for said abutment members including anti-friction devices providing for sliding movement of the same in the direction of the length of said furnace cylinder.

13. In combination with the rotating cylinder of a furnace of the type described, a manifold and a manifold head fixed on said cylinder and communicating with the interior thereof, a non-rotative blast head closed against said manifold head, means for holding said blast head in yielding closed engagement against said manifold head while at the same time permitting free, relative sliding movement between said heads in any direction in the plane of contact of said heads, said heads being spaced radially from the outer surface of said furnace cylinder, one of said heads being provided with a grease groove, and grease cups on one of said heads connected with said grease groove.

In testimony, that I, claim the foregoing as my invention I affix my signature in the presence of two witnesses.

GEORGE F. DOWNS.

Witnesses:
WALTER BRYAN,
JULIA WUNSCH.